United States Patent
Cain et al.

(10) Patent No.: US 10,397,596 B2
(45) Date of Patent: Aug. 27, 2019

(54) SELF-SIMILAR REFERENCE MASKS FOR PERSISTENCY IN A VIDEO STREAM

(71) Applicant: Cisco Technology, Inc., San Jose, CA (US)

(72) Inventors: Harel Cain, Jerusalem (IL); Michal Devir, Haifa (IL); Yaron Sella, Beit Nekofa (IL)

(73) Assignee: Cisco Technology, Inc., San Jose, CA (US)

(*) Notice: Subject to any disclaimer, the term of this patent is extended or adjusted under 35 U.S.C. 154(b) by 23 days.

(21) Appl. No.: 15/673,438

(22) Filed: Aug. 10, 2017

(65) Prior Publication Data
US 2019/0052891 A1  Feb. 14, 2019

(51) Int. Cl.
| | |
|---|---|
| *G06T 1/00* | (2006.01) |
| *H04N 19/132* | (2014.01) |
| *H04N 19/139* | (2014.01) |
| *H04N 19/14* | (2014.01) |
| *H04N 19/174* | (2014.01) |

(Continued)

(52) U.S. Cl.
CPC ......... *H04N 19/467* (2014.11); *G06T 1/0035* (2013.01); *H04N 19/132* (2014.11); *H04N 19/139* (2014.11); *H04N 19/14* (2014.11); *H04N 19/174* (2014.11); *H04N 19/44* (2014.11); *H04N 19/52* (2014.11); *H04N 19/593* (2014.11); *G06T 2201/0051* (2013.01); *G06T 2201/0053* (2013.01); *G06T 2201/0065* (2013.01)

(58) Field of Classification Search
None
See application file for complete search history.

(56) References Cited

U.S. PATENT DOCUMENTS

| | | |
|---|---|---|
| 6,332,030 B1 | 12/2001 | Manjunath et al. |
| 7,567,721 B2 | 7/2009 | Alattar et al. |

(Continued)

FOREIGN PATENT DOCUMENTS

| | | |
|---|---|---|
| CN | 101442672 | 4/2012 |
| KR | 2005119692 | 12/2005 |
| WO | 2016/200580 | 12/2016 |

OTHER PUBLICATIONS

Solachidis. V. et al.; Self-Similar Ring Shaped Watermark Embedding in 2-D DFT Domain (Sep. 2000).

(Continued)

*Primary Examiner* — Alison Slater
(74) *Attorney, Agent, or Firm* — Merchant & Gould P.C.

(57) ABSTRACT

In one embodiment, a method including dividing a reference mask into a plurality of reference mask divisions, determining a plurality of motion vectors respectively associated with a plurality of slice divisions, wherein the plurality of reference mask divisions respectively correspond to the plurality of slice divisions, modifying a blurring kernel in accordance with the plurality of motion vectors, yielding a plurality of modified blurring kernels that are respectively associated with the plurality of slice divisions, and performing at least one action to yield an altered reference mask, including for the plurality of reference mask divisions and the plurality of modified blurring kernels: convolving a reference mask division with a weighted function of at least a modified blurring kernel associated with a slice division, of the plurality of slice divisions, to which the reference mask division corresponds.

20 Claims, 6 Drawing Sheets

(51) Int. Cl.
*H04N 19/467* (2014.01)
*H04N 19/593* (2014.01)
*H04N 19/52* (2014.01)
*H04N 19/44* (2014.01)

(56) References Cited

U.S. PATENT DOCUMENTS

| | | |
|---|---|---|
| 8,965,039 B2 | 2/2015 | Evans et al. |
| 2015/0016663 A1 | 1/2015 | Tehranchi et al. |
| 2017/0006301 A1 | 1/2017 | Cain et al. |

OTHER PUBLICATIONS

Tsekeridou, S. et al.; Embedding Self Similar Watermarks in the Wavelet Domain (2000).

Tseng, Hsien-Wen et al.; Data Hiding for Binary Images Using Weight Mechanism; Third International Conference on Intelligent Information Hiding and Multimedia Signal Processing (IIH-MSP 2007), Kaohsiung, 2007, pp. 307-310. doi: 10.1109/IIHMSP.2007.4457551.

Piva, Alessandro et al.; Secure Client-Side ST-DM Watermark Embedding; in IEEE Transactions on Information Forensics and Security, vol. 5, No. 1, pp. 13-26, Mar. 2010. doi: 10.1109/TIFS.2009.2038761.

Zhang, Liwei et al.; A Novel Watermarking Scheme With Compensation in Bit-Stream Domain for H.264/AVC; 2010 IEEE International Conference on Acoustics, Speech and Signal Processing, Dallas, TX, 2010, pp. 1758-1761. doi: 10.1109/ICASSP.2010.5495443.

Wikipedia; (2016) Can be seen at: https://en.wikipedia.org/wiki/Gaussian_blur.

Do, Chuong B.; The Multivariate Gaussian Distribution; Section Notes, Lecture on Machine Learning, CS 229 (Oct. 10, 2008).

SELF-SIMILAR REFERENCE MASKS FOR PERSISTENCY IN A VIDEO STREAM

TECHNICAL FIELD

The present disclosure generally relates to reference masks for a video stream.

BACKGROUND

A watermark payload may be embedded in a video stream. If the video stream is to be received by a plurality of client devices, the watermark payload may be specific to every client device receiving the video stream, or may be common to the plurality of receiving client devices. Similarly, the watermark payload may be specific to a headend, or may be common to various headends.

Examples of video standards that may be used to generate the video stream include the H.262 video standard, the H.264 video standard, the H.265 video standard, etc.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
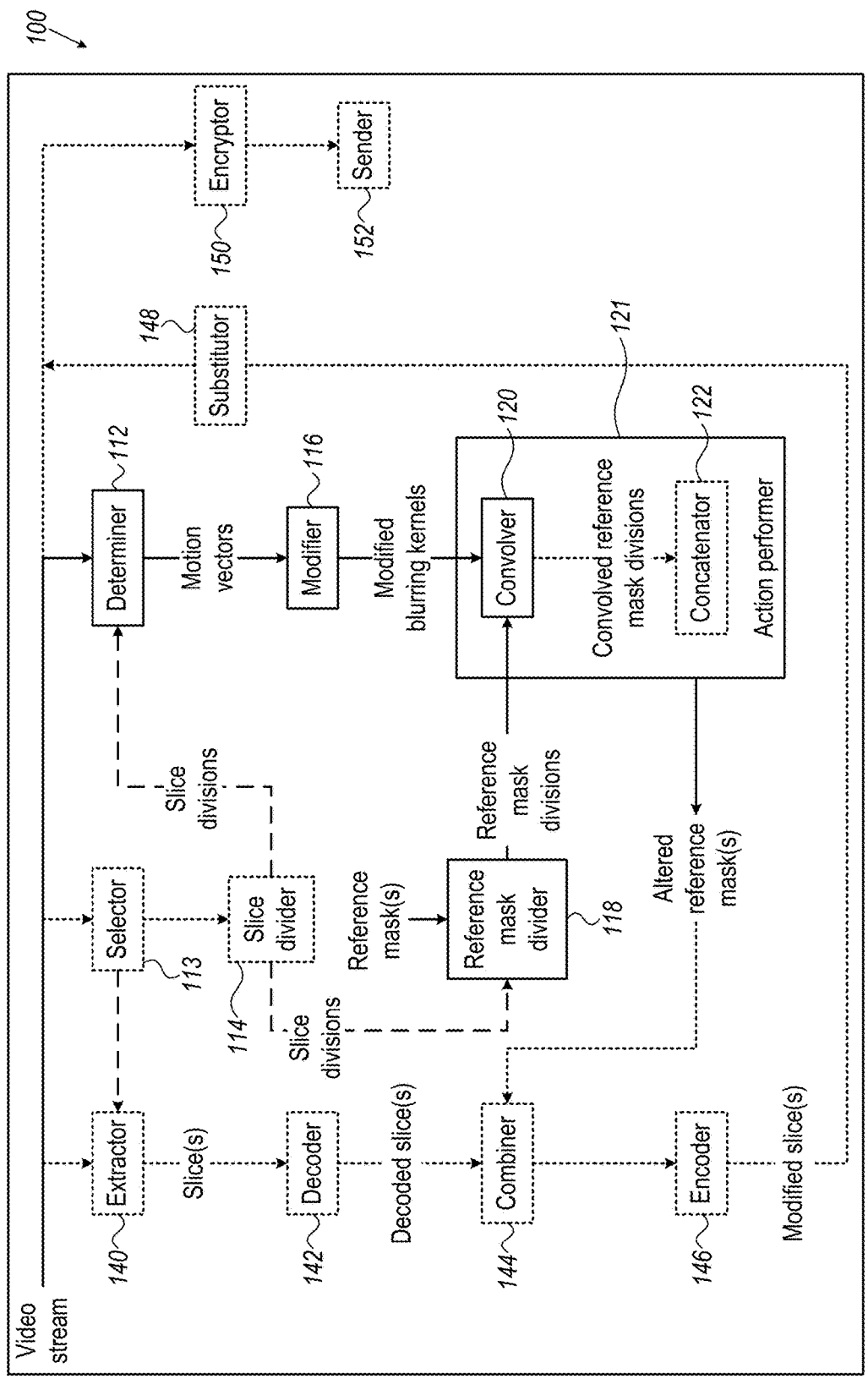
FIG. 1 is a simplified block diagram of a system, in accordance with some embodiments of the presently disclosed subject matter.

There is provided, in accordance with some embodiments of the presently disclosed subject matter, a system including a reference mask divider adapted to divide a reference mask into a plurality of reference mask divisions, a determiner adapted to determine a plurality of motion vectors respectively associated with a plurality of slice divisions, wherein the plurality of reference mask divisions respectively correspond to the plurality of slice divisions, a modifier adapted to modify a blurring kernel in accordance with the plurality of motion vectors, yielding a plurality of modified blurring kernels that are respectively associated with the plurality of slice divisions, and an action performer adapted to perform at least one action to yield an altered reference mask, the action performer including a convolver adapted, for the plurality of reference mask divisions and the plurality of modified blurring kernels: to convolve a reference mask division with a weighted function of at least a modified blurring kernel associated with a slice division, of the plurality of slice divisions, to which the reference mask division corresponds.

Example Embodiments

In some embodiments of the subject matter, reference mask(s) may represent watermark payload(s). Reference mask(s) may be combined, for instance at a headend, with decoded and/or uncompressed version(s) of certain video slice(s) ("slice(s)"). The combination(s) of the decoded and/or uncompressed version(s) of certain slice(s) with the reference mask(s) may be encoded and included in a video stream. Slices of the video stream that use inter-prediction (direct and/or indirect) from the certain slice(s) are not modified in order to compensate for the reference mask(s). Herein, unless specified otherwise, the term "predict" and variants thereof refer to direct and/or indirect prediction. Due to the non-compensation, the reference mask(s) may drift during the decoding of the video stream, into one or more of the slice(s) which use inter-prediction from the certain slice(s). Such drifting may allow for a more robust detection of the watermark payload(s) represented by the reference mask(s) than if drifting did not take place, since the watermark payload(s) may be detectable from the slice(s) which use inter-prediction. The decoding and/or detection may be performed, for instance at an operations security center, as will be described in more detail below. The operations security center may be co-located with a headend or may be located elsewhere.

A reference mask in accordance with some embodiments of the subject matter which represents a watermark payload may be self-similar under small shifts in random directions (e.g. may have similar adjacent pixels). The self-similarity may be within the typical sizes of motion vectors in the video stream (e.g. self-similar within 3 to 5 pixels in any direction). The self-similarity may be tailored to the specific nature of movement associated with the certain slice whose decoded or uncompressed version is combined with the reference mask. If the reference mask is self-similar, and especially if the self-similarity is tailored to the motion, less degradation of the reference mask may ensue from motion prediction during the decoding. In other words, the drifting property of the reference mask may be caused and/or enhanced due to the nature of reference mask (also referred to as: reduced-degradation of the reference mask, higher correlation of the reference mask, or persistency of the reference mask). Therefore the watermark payload of the reference mask may be more likely to be detectable from slice(s) that use inter-prediction from the certain slice or from an altered version of such a slice. For example such a reference mask may degrade less due to motion prediction, and therefore the watermark payload may be more likely to be detectable from the slice(s) that use inter-prediction than if the watermark payload were represented by a reference mask having low or no spatial autocorrelations (e.g. modeled as additive white Gaussian noise with every pixel being independent from all others). A reference mask with self-similarity tailored to the motion is referred to below as an altered reference mask, and systems and methods to obtain such a reference mask will now be described.

Reference is now made to FIG. 1 which is a simplified block diagram of a system 100, in accordance with some embodiments of the presently disclosed subject matter. Modules that are illustrated in FIG. 1 and that may be comprised in system 100 will now be described.

As illustrated in FIG. 1, system 100 includes a determiner 112 adapted to determine the movement(s) associated with slice(s) in a video stream, or more particularly to determine motion vectors associated with slice divisions of the slice(s) and/or of neighboring slice(s). Any particular slice in the video stream may encode an entire frame or may encode a part of a frame. A neighboring slice of a particular slice may, for instance, be subsequent in display order to the particular slice. If the particular slice encodes an entire frame then a neighboring slice may encode a subsequent frame in display order. If the particular slice encodes a part of a frame, then a neighboring slice may encode a portion of a subsequent frame in display order that is in the same location within the subsequent frame, as the part is within the particular frame. Additionally or alternatively, a neighboring slice of a particular slice may, for instance, be preceding in encode order to a particular slice. In such a case, if the particular slice encodes an entire frame then a neighboring slice may encode a preceding frame in encode order. If the particular slice encodes a part of a frame, then a neighboring slice may encode a portion of a preceding frame in encode order that is in the same location within the preceding frame, as the part is within the particular frame. The video stream is assumed to have been generated by an encoder, for instance, in accordance with the H.262, H.264, or H.265 video standard. For example, the encoder that generated the video stream may be an optional encoder 146, or may be a different encoder in system 100 or external to system 100.

FIG. 1 shows system 100 including an optional selector 113 adapted to select the slice(s) and an optional slice divider 114 adapted to divide the slice(s) and/or neighboring slice(s) into slice divisions. In some cases, selector 113 may be adapted to select slice(s) that are of one or more particular types, e.g. intra-predicted slice(s) (also referred to as intra-coded slice(s), or I-slice(s)), whereas in other cases selector 113 may be adapted to select slice(s) that are not necessarily of particular type(s). Additionally or alternatively, selector 113 may be adapted to select slice(s) at a certain frequency (e.g. slices encoding every $10^{th}$ frame, slices encoding first part of every $15^{th}$ frame, etc.) Additionally or alternatively, in some cases, selector 113 may be adapted to select a limited quantity of slice(s), or slice(s) limited to a certain percentage of the video stream e.g. less than all of the video stream; whereas in other cases the number of selected slice(s) may not be limited. In some embodiments, selector 113 and/or slice divider 114 may be omitted. For instance, the slice(s) may be selected manually. Additionally or alternatively, for instance, the slice(s) and/or neighboring slice(s) may not necessarily have to be divided into slice divisions, for instance if previously divided into slice divisions and/or as long as information regarding the slice divisions (e.g. associated motion vectors, locations, etc.) may be determinable. The dashed line between slice divider 114 and determiner 112 represents that the determined motion vectors are associated with the slice divisions.

System 100 further includes a modifier 116 adapted to modify a blurring kernel in accordance with the determined motion vectors, and a reference mask divider 118 adapted to divide each of one or more reference masks into a plurality of reference mask divisions. The reference mask divisions of a particular reference mask may correspond respectively to a particular plurality of slice divisions, as represented by the dashed line between slice divider 114 and reference mask divider 118. System 100 further includes an action performer 121 adapted to perform at least one action to yield one or more altered reference masks. Action performer 121 includes convolver 120 adapted to convolve reference mask divisions with the modified blurring kernels. Optionally action performer 121 further includes an optional concatenator 122 adapted to concatenate convolved reference mask divisions.

If the watermark payload(s) represented by the altered reference mask(s) are to be embedded in the video stream and the slice(s) are already in the video stream, then system 100 may further include an optional extractor 140 adapted to extract the slice(s) for which the motion vectors are being determined, and/or for which neighboring motion vectors are being determined, from the video stream. For example, extractor 140 may extract the slice(s) based on the selection of selector 113, as represented by the dashed line between selector 113 and extractor 140. System 100 may further include an optional decoder 142 adapted to decode the extracted slice(s), an optional combiner 144 adapted to a combine the altered reference mask(s) with the decoded slice(s), and optional encoder 146 adapted to encode the result of the combining, yielding modified slice(s). System 100 may further include an optional substitutor 148 adapted to include the modified slice(s) in the video stream, e.g. by substituting the modified slice(s) in place of the extracted slice(s). The watermark payload(s) may thereby be embedded in the video stream. Depending on the embodiment, one or more modified slice(s) may be substituted for a particular extracted slice. For example, substitutor 148 may perform the functionality of the stitcher described in co-pending application Ser. No. 15/607,542 titled "systems and methods for stitching separately encoded NAL units into a stream" filed on May 29, 2017, which is hereby incorporated by reference herein.

System 100 may further include an optional encryptor 150 adapted to encrypt the video stream (with the modified slice(s)), if the video stream is to be sent encrypted. System 100 may further include an optional sender 152 adapted to send the video stream, whether encrypted or not encrypted. For instance, system 100 may be at a headend and the video stream may be sent from the headend to one or more client devices via any appropriate network. For example, sending from a headend to one or more client devices may include satellite transmission, terrestrial transmission, cable, over-the-top transmission, etc. Examples of client device(s) include a tablet device, smartphone, desktop or portable computer, set-top box, Internet-enabled television, media center PC, or any other suitable device, such as is known in the art.

Although system 100 is shown in a box, in some embodiments system 100 may be concentrated in the same location or may be distributed over a plurality of locations.

In some embodiments, system 100 may be a headend or may be included in a headend.

In some embodiments, system 100 may include fewer, more and/or different modules than shown in FIG. 1. For example, the functionality of any different and/or additional modules may relate to the subject matter and/or may be unrelated/tangential to the subject matter.

Figure 3:
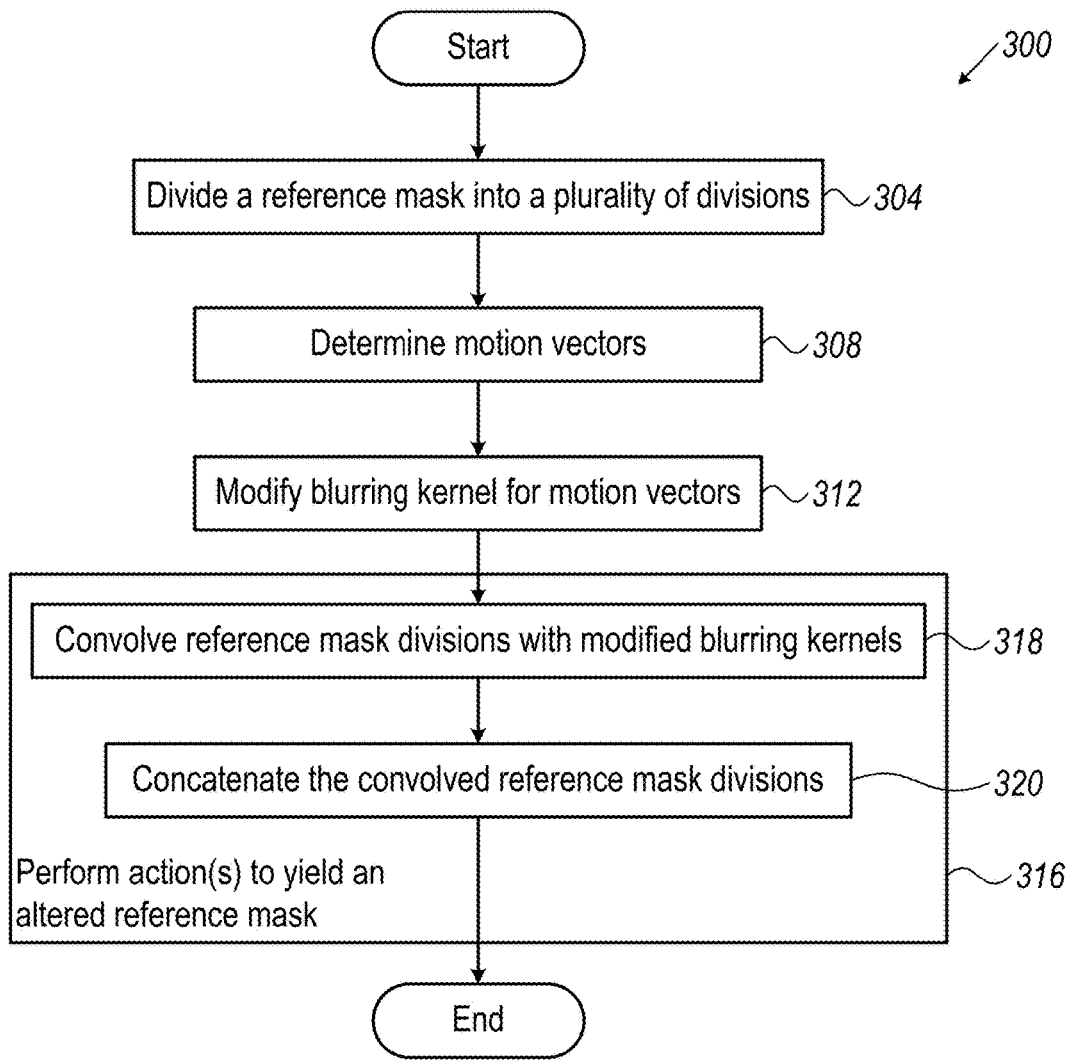
FIG. 3 is a flowchart of a method, in accordance with some embodiments of the presently disclosed subject matter.

As another example, system 100 may not necessarily include any or all of modules 113, 114, 122, 140, 142, 144, 146, 148, 150 and/or 152, in order to be adapted to perform method 300 (see FIG. 3). Continuing with describing such an example, in some cases, watermark payload(s) represented by the altered reference mask(s) may additionally or alternatively be embedded in a video stream, during the encoding which generated the video stream. In such an example, extractor 140, decoder 142, encoder 146, and/or substitutor 148 may be omitted from system 100. Referring for simplicity's sake to a single given slice, an uncompressed version of the given slice, or a decoded version of the given slice, may be combined (e.g. by combiner 144) with an altered reference mask. The result of the combining may be encoded as part of the generation of the video stream, yielding a modified slice which is included in the video stream. The watermark payload represented by the altered reference mask may thereby be embedded in the video stream. The encoder which generates the video stream may be adapted to encode slice(s) that use inter-prediction from the given slice, to not compensate for the altered reference mask, or in other words to ignore the altered reference mask, by not encoding the slice(s) to inter-predict from the modified slice but rather from the given slice.

Figure 2:
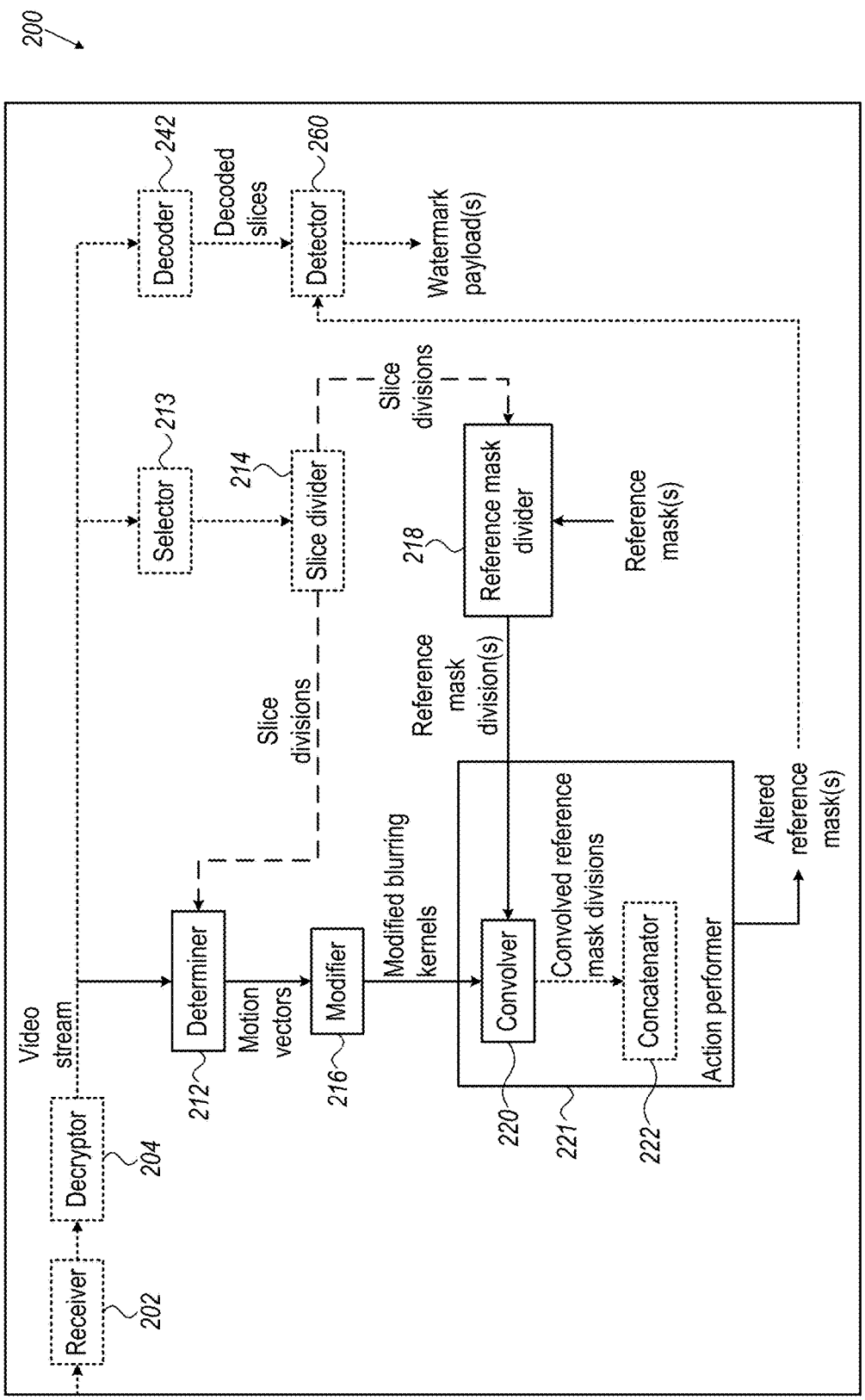
FIG. 2 is another simplified block diagram of a system, in accordance with some embodiments of the presently disclosed subject matter.

FIG. 2 is a simplified block diagram of a system 200, in accordance with some embodiments of the presently disclosed subject matter. Modules that are illustrated in FIG. 2 and that may be comprised in system 200 will now be described.

As illustrated in FIG. 2, system 200 includes an optional receiver 202 adapted to receive a video stream, and an optional decryptor 204 adapted to decrypt the video stream if the video stream was encrypted. Receiving may include any suitable receiving. For example, the video stream may be provided to system 200 after having been intercepted due to being suspected of having been distributed without authorization and system 200 may thereby receive the video stream; or system 200 may intercept (and thereby receive) the video stream. The video stream may be the same as the original version from before the unauthorized distribution (e.g. original version sent by system 100—FIG. 1), or may be different from the original version, having been changed during the unauthorized distribution. For example, during the unauthorized distribution, the original video stream may have been decoded, allowing the altered reference mask(s) embedded in the original video stream (e.g. by system 100) to drift into inter-predicted slice(s). The decoded video stream may have then been re-encoded during the unauthorized distribution, maintaining the drifted altered reference mask(s).

System 200 further includes a determiner 212 adapted to determine the movement(s) associated with altered slice(s) in a video stream, or more particularly to determine motion vectors associated with slice divisions of the altered slice(s) and/or of neighboring slice(s). The altered slices may be the same as the modified slice(s) from encoder 146 of FIG. 1 or may have been further changed afterwards such as during the unauthorized distribution.

FIG. 2 shows system 200 including an optional selector 213 to select the altered slice(s) and an optional slice divider 214 to divide the altered slice(s) and/or neighboring slice(s) into slice divisions. In some cases, selector 213 may be adapted to select altered slice(s) that are presumed to have been modified by system 100 based on any reason such as: being of one or more particular types, (e.g. intra-coded slice(s)), conforming to a certain frequency, prior knowledge of which slice(s) in the video stream were modified by system 100, etc. In some embodiments, selector 213 and/or slice divider 214 may be omitted. For instance, the altered slice(s) may be selected manually, and/or the altered slice(s) and/or neighboring slice(s) may not necessarily have to be divided into slice divisions, for instance if previously divided into slice divisions and/or as long as information regarding the slice divisions (e.g. associated motion vectors, locations, etc.) may be determinable. The dashed line between slice divider 214 and determiner 212 represents that the determined motion vectors are associated with the slice divisions.

System 200 further includes a modifier 216 adapted to modify a blurring kernel in accordance with the determined motion vectors, and a reference mask divider 218 adapted to divide each of one or more reference masks into a plurality of reference mask divisions. The reference mask divisions may correspond respectively to the slice divisions, as represented by the dashed line between slice divider 214 and reference mask divider 218. System 200 further includes an action performer 221 adapted to perform at least one action to yield one or more altered reference masks. Action performer 221 includes convolver 220 adapted to convolve reference mask divisions with the modified blurring kernels. Optionally action performer 221 further includes an optional concatenator 222 adapted to concatenate convolved reference mask divisions.

System 200 further includes an optional decoder 242 adapted to decode the video stream, and an optional detector 260 adapted to use the altered reference mask(s) from action performer 221 to detect watermark payload(s) embedded in the video stream. For example, detector 260 may be adapted to correlate the altered reference mask(s) against decoded slice(s) from decoder 242, in order to detect high correlation coefficient(s). High correlation coefficient(s) may be expected to be detected, for instance, for the altered slice(s); and/or may be expected to be detected, for instance, for slice(s) which use inter-prediction from the altered slice(s) and/or use inter-prediction from the slice(s) which were altered to yield the altered slice(s) (e.g. modified by system 100 and optionally further changed afterwards such as during unauthorized distribution).

It is noted that the reference mask(s) that are used by system 200 (e.g. inputted into reference mask divider 218) may not necessarily be identical to the reference mask(s) used by system 100 (e.g. inputted into reference mask divider 118) for the video stream (or for the original version of the video stream). For example, the reference mask(s) used by system 200 may be base reference mask(s), on which all possible reference mask(s) that may have been used in system 100 (e.g. may have been inputted into reference mask divider 118—FIG. 1) are based. Additionally or alternatively, the motion vector(s) associated with the slice divisions of the altered slice(s) and/or of neighboring slice(s), may not necessarily be the same as the motion vector(s) associated with the slice division(s) of the slice(s) and/or of neighboring slice(s) that were used by system 100. Difference(s) in the motion vector(s) may have arisen due to the slice(s) having been altered to yield the altered slice(s), or due to the neighboring slice(s) having been altered. For instance, the altering of the slice(s) may have included modification at system 100 (e.g. by combining decoded or uncompressed version(s) of the slice(s) with altered reference mask(s) and encoding the result(s) of the combining). Additionally or alternatively the altering of the slice(s) and/or of the neighboring slice(s) may have included later changing (e.g. changing during the unauthorized distribution). Therefore, for either of the above reasons and/or for any other reason(s), the altered reference mask(s) yielded by action performer 121 of system 100 may not necessarily be the same as the altered reference mask(s) yielded by action performer 221 of system 200. However, it is assumed that the altered reference mask(s) yielded by action performer 221 of system 200 may nevertheless be successfully used by detector 260 to detect the watermark payload(s) embedded in the video stream, as the watermark payload(s) are typically although not necessarily designed to withstand reasonable video transformation(s).

Although system 200 is shown in a box, in some embodiments system 200 may be concentrated in the same location or may be distributed over a plurality of locations.

In some embodiments, system 200 may be an operations security center or may be included in an operations security center.

In some embodiments, system 200 may include fewer, more and/or different modules than shown in FIG. 2. For example, the functionality of any different and/or additional modules may relate to the subject matter and/or may be unrelated/tangential to the subject matter. As another example, system 200 may not necessarily include any or all of modules 202, 204, 213, 214, 222, 242, and/or 260, in order to be adapted to perform method 300 (FIG. 3). Additionally or alternatively, system 200 may omit modules 212, 213, 214, 216, 218, 220, 221 and/or 222, if not performing method 300 and detector 260 is adapted to use reference mask(s) having low or no spatial autocorrelations for the detection.

FIG. 3 is a flowchart of a method 300, in accordance with some embodiments of the presently disclosed subject matter. Method 300 may be performed by system 100 and/or 200.

For ease of understanding, method 300 will be described with reference to a single reference mask and with reference to a single plurality of slice divisions comprised in a whole (e.g. a slice of interest, altered slice of interest, or neighboring slice). The slice of interest or altered slice of interest may be of interest in order to tailor the reference mask to the movement associated with the slice or altered slice.

In stage 304, system 100 or 200 (e.g. reference mask divider 118 or 218) divides a reference mask into a plurality of reference mask divisions. For example, the dividing of the reference mask may be performed so that the resulting plurality of reference mask divisions respectively correspond to a plurality of slice divisions. For example, a given reference mask division (from the plurality of reference mask divisions) corresponding to a given slice division (from the plurality of slice divisions) may include: the location of the given reference mask division within the reference mask being the same as the location of the given slice division within the whole that comprises the slice divisions; and the size of the given reference mask division size being the same as the size of the given slice division. The whole may be, for instance, the slice of interest, altered slice of interest, or neighboring slice.

The plurality of slice divisions may be divisions within the slice/altered slice that are associated with respective motion vectors. Additionally or alternatively, the plurality of slice divisions may be divisions within a neighboring slice to the slice/altered slice, the slice divisions of a neighboring slice associated with respective motion vectors. Such neighboring motion vectors are assumed to adequately represent the movement associated with the slice or altered slice. Slice divisions of a neighboring slice that is subsequent in display order may be used, for example, if a slice/altered slice (e.g. I-slice) does not include slice divisions associated with motion vectors. Additionally or alternatively slice divisions of a neighboring slice that is preceding in encode order may be used because the slice may be currently uncompressed, the encoding information may not have yet been generated for the slice, and it may be undesirable to calculate the motion vectors without the encoding information. The slice divisions, and therefore the respectively corresponding reference mask divisions, need not all be of the same size.

Figure 4:
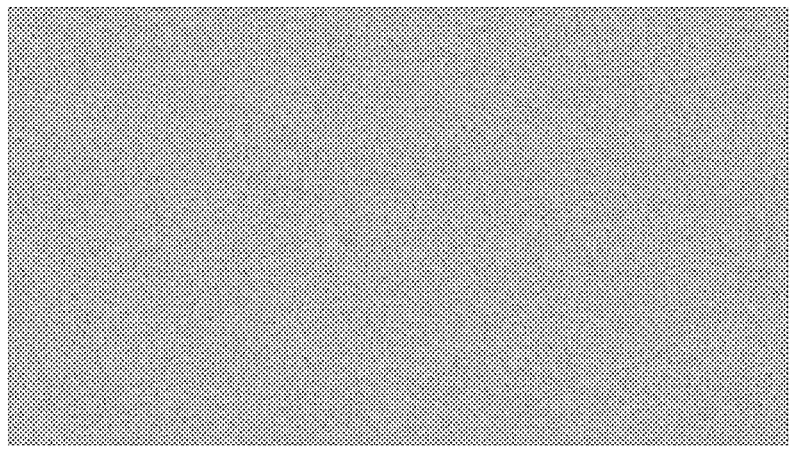
FIG. 4 illustrates a reference mask which may be divided in the method of FIG. 3, in accordance with some embodiments of the presently disclosed subject matter.

FIG. 4 illustrates a reference mask 400 which may be divided in stage 304, in accordance with some embodiments of the presently disclosed subject matter.

In stage 308, system 100 or 200 (e.g. determiner 112 or 212) determines a plurality of motion vectors. The plurality of motion vectors are associated with the plurality of slice divisions.

Figure 5:
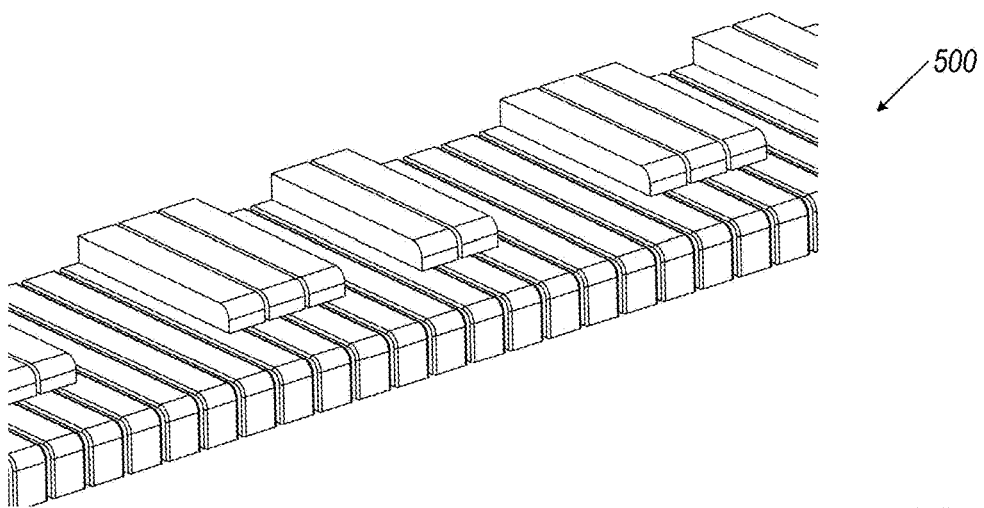
FIG. 5 illustrates a frame that is in a video stream, in accordance with some embodiments of the presently disclosed subject matter.

FIG. 5 illustrates a frame 500 that is in a video stream, in accordance with some embodiments of the presently disclosed subject matter. The slice being discussed in method 300 may, for example, encode frame 500.

Referring to any given slice division of the plurality of slice divisions, the determination of a motion vector associated with a given slice division may vary depending on the embodiment, and may include any appropriate determining. In some embodiments, the determination of a motion vector associated with a given slice division may be dependent on encoding information. For example, if a given slice division is a motion prediction division, a motion vector difference ("mvd") may be specified in the encoding information that is in a video stream for the given slice division, e.g. mvd_I0 and mvd_I1 sub-elements of the mb_pred( ) and sub_pred( ) elements in the H.264 and H.265 video standards. As another example, the motion vector differences may be specified for sub-divisions of the slice division, where in such an example the sub-divisions may be the motion prediction divisions. As another example, motion vector difference(s) specified for neighboring slice(s) to the slice or altered slice may be used, in addition to or instead of motion vector difference(s) specified for the given slice division of the slice or altered slice, or specified for sub-divisions of the given slice division. As another example, motion vector difference(s) specified for other neighboring slice(s) to the slice or altered slice may be used, in addition to motion vector difference(s) specified for a given slice division of a neighboring slice, or specified for sub-divisions of the given slice division.

In such embodiments, the determination of a motion vector associated with any given slice division may include, for instance, a full or partial decoding of the given slice division, including the motion vector difference(s). Such decoding is known in the art and may use any appropriate technique(s) such as spatial direct, temporal direct, regular, skip, etc. The decoding may yield the motion vector associated with a given slice division, e.g. if the slice division is a motion prediction division.

Additionally or alternatively, in such embodiments, for example, a full or partial decoding of the given slice division may yield motion vectors for sub-divisions of the given slice division, the sub-divisions being motion prediction divisions. Additionally or alternatively, for example, a full or partial decoding may be performed for other slice(s), such as neighboring slice(s) if the given slice division is comprised in the slice or altered slice; or such as other neighboring slice(s) if the given slice division is comprised in a neighboring slice. In the latter two examples, the yielded motion vectors may include the motion vector(s) yielded for the given slice division (e.g. of a slice/altered slice or a neighboring slice) or for subdivisions of the given slice division; and/or may include additional motion vector(s) yielded for the other slice(s) (e.g. neighboring slice(s) or other neighboring slice(s)). The motion vector associated with a given slice division may then be derived from any of such motion vectors. For instance, in order to derive the motion vector associated with the given slice division, one motion vector may be selected, or various motion vectors may be weighted equally and/or non-equally. The one motion vector that may be selected as the motion vector associated with the given slice division may be the motion vector yielded for the given slice division; or a motion vector yielded for a neighboring slice (or for another neighboring slice, if a neighboring slice comprises the given slice division). In cases where various motion vectors are weighted in order to derive the motion vector associated with a given slice division, the various motion vectors may be weighted equally, for instance, if relating to sub-divisions of the given slice division. Various motion vectors may be weighted non-equally, for instance, if relating to the slice/altered slice that comprises the given slice division and to neighboring slice(s) (or if relating to the neighboring slice that comprises the given slice division and to other neighboring slice(s)), with motion vectors for neighboring slices that are closer in time in display order and/or in encode order to the slice/altered slice weighted more heavily. If various motion vectors relate to sub-divisions of various slice(s), the weights may, for instance, be equal within a slice, and unequal between different slices.

Additionally or alternatively, in some embodiments, the determination of a motion vector associated with a given slice division may be performed by determiner 112 or 212 computing motion vector(s), without using the encoding information. In such embodiments, the determination of a motion vector associated with a given slice division may include computing the motion vector for the given slice division (e.g. of a slice/altered slice or a neighboring slice), computing the motion vectors for subdivisions of the given slice division, and/or computing additional motion vector(s) for other slice(s) (e.g. neighboring slice(s) of the slice or altered slice if the given slice division is comprised in the slice or altered slice; or other neighboring slice(s) if the given slice division is comprised in a neighboring slice). The motion vector associated with a given slice division may then be derived from any of such motion vectors. For example, the motion vector associated with the given slice division may be the computed motion vector for the given slice division or the motion vector computed for another slice. As another example, the motion vector associated with the given slice division may be derived from various computed motion vectors, that may be weighted equally and/or non-equally as discussed above.

A motion vector that is associated with any given slice division may include an x component (referred to herein as delta_x) and a y component (referred to herein as delta_y).

Optionally, system 100 or 200 (e.g. determiner 112 or 212) calculates a plurality of magnitudes, and a plurality of directions, for the plurality of motion vectors determined in stage 308 that are associated with the plurality of slice divisions. For example, the magnitude of a given motion vector determined for a given slice division may be represented by the norm of the given motion vector. The norm of the given motion vector may be defined as $$\text{norm} = (\text{delta\_}x_{mv})^2 + (\text{delta\_}y_{mv})^2 \quad \text{(equation 1)}$$

Where "mv" refers to the given motion vector. The direction of a given motion vector may be represented by the angle of the given motion vector. The angle of the given motion vector may be defined as $$\text{angle}_{mv} = \arctan 2(\text{delta\_}y_{mv}, \text{delta\_}x_{mv}) \quad \text{(equation 2)}$$

where the arctan 2 function is as defined in various computer languages such as in the math.h standard library of the C programming language. The arctan 2 function returns the angle of the motion vector in the range of 0 to 2π, for a motion vector whose axis projections are delta_x and delta_y.

It is noted that if there is no motion vector associated with a given slice division it may be indicative of no motion for the given slice division. In such a case, the norm is assumed to be zero and the angle is assumed to be undefined and not needed.

Magnitudes and directions may be calculated, if the results of such calculations will be used in stage 312. Otherwise, magnitudes and/or direction may not necessarily be calculated.

In stage 312, a blurring kernel is modified by system 100 or 200 (e.g. by modifier 116 or 216) in accordance with the plurality of motion vectors determined in stage 308. A plurality of modified blurring kernels are thereby yielded. Because the plurality of motion vectors are respectively associated with the plurality of slice divisions, the plurality of modified blurring kernels may also be considered to be respectively associated with the plurality of slice divisions.

The blurring kernel may be, for instance, a Gaussian blurring kernel with a given sigma value that quantifies a spatial variance. Such a blurring kernel may be symmetric in both axes. Additionally or alternatively, the blurring kernel may be any other type of kernel that may act as a low pass filter. Such a blurring kernel may not necessarily be symmetric in both axes. Typically although not necessarily the modification of a blurring kernel in accordance with a given motion vector will result in a modified blurring kernel which is not symmetric in both axes.

An example of a Gaussian blurring kernel is shown directly below, for the purposes of illustration. The example Gaussian blurring kernel includes integer coefficients, before normalization and with a sigma of 1.

[[0, 1, 2, 1, 0],
[1, 5, 9, 5, 1],
[2, 9, 15, 9, 2],
[1, 5, 9, 5, 1],
[0, 1, 2, 1, 0]]

It should be evident that other blurring kernels may be used in various embodiments.

The modification of a blurring kernel in accordance with any given motion vector may include stretching, rotation and/or normalization of the blurring kernel, where the stretching and/or rotation may be dependent on the given motion vector. In some embodiments described herein, it is assumed that stretching, rotation and normalization take place. As the angle in equation 2 is computed with respect to the x axis, the blurring kernel may be stretched in the horizontal direction. The blurring kernel may be stretched, for instance, in the horizontal direction by a function of the magnitude (e.g. a function of the norm) for the given motion vector, yielding a stretched blurring kernel. For example, the function may be a continuous function that is monotonically increasing such that $$F(x):[0,\inf] \to [1,\inf] \quad \text{(equation 3), where inf refers to infinity.}$$

The function may equal 1 for an x value (in this case magnitude value) of zero. Examples of such a function may include $$F(x) = x+1; F(x) = x^2+1; F(x) = \log(x+1); \text{ etc}$$

For efficient application of stage 312 when a given motion vector is large, the function may be defined, for example, so that for a magnitude (e.g. for a norm) above a certain threshold, the function returns a constant value.

If the example Gaussian blurring kernel presented above is stretched, say by a factor of 2.5, in the horizontal direction, the example stretched Gaussian blurring kernel shown directly below results:

[[0, 0, 0, 0, 1, 1, 1, 1, 0, 0, 0, 0],
[0, 1, 3, 4, 6, 8, 8, 6, 4, 3, 1, 0],
[1, 2, 5, 8, 11, 13, 13, 11, 8, 5, 2, 1],
[0, 1, 3, 4, 6, 8, 8, 6, 4, 3, 1, 0],
[0, 0, 0, 0, 1, 1, 1, 1, 0, 0, 0, 0]]

Continuing with the description of embodiments that include stretching, rotating, and normalizing, the stretched blurring kernel may then be rotated by the angle that was calculated for the motion vector, yielding a rotated stretched blurring kernel.

If the example stretched Gaussian blurring kernel presented above is rotated, say by 25 degrees in the counter-clockwise direction, the example rotated stretched Gaussian blurring kernel shown directly below results:

[[0, 0, 0, 0, 1, 3, 3, 3, 1],
[0, 0, 2, 5, 7, 8, 7, 4, 1],
[0, 2, 6, 10, 12, 9, 5, 2, 0],
[2, 5, 9, 9, 8, 5, 2, 0, 0],
[2, 4, 4, 4, 2, 0, 0, 0, 0],
[0, 1, 0, 0, 0, 0, 0, 0, 0]]

Continuing with the description of embodiments that include stretching, rotating and normalizing, the rotated stretched blurring kernel may then be normalized to a sum of 1. The normalizing may include dividing the kernel as a matrix by the sum of the kernel, thereby yielding a normalized, rotated, stretched blurring kernel which in this case is the modified blurring kernel for the given motion vector.

If the example rotated stretched Gaussian blurring kernel presented above is normalized, the example normalized, rotated, stretched Gaussian blurring kernel shown directly below results:

[[0., 0., 0., 0., 0.00675676, 0.02027027, 0.02027027, 0.02027027, 0.00675676],
[0., 0., 0.01351351, 0.03378378, 0.0472973, 0.05405405, 0.0472973, 0.02702703, 0.00675676],
[0., 0.01351351, 0.04054054, 0.06756757, 0.08108108, 0.06081081, 0.03378378, 0.01351351, 0.],
[0.01351351, 0.03378378, 0.06081081, 0.06081081, 0.05405405, 0.03378378, 0.01351351, 0., 0.],
[0.01351351, 0.02702703, 0.02702703, 0.02702703, 0.01351351, 0., 0., 0., 0.],
[0., 0.00675676, 0., 0., 0., 0., 0., 0., 0.]]

In stage 316, at least one action is performed by system 100 or 200 (e.g. by action performer 121 or 221), to yield an altered reference mask. The action(s) include stage 318. In stage 318, for the plurality of reference mask divisions and the plurality of modified blurring kernels, system 100 or 200 (e.g. convolver 120 or 220) convolves a reference mask division with a weighted function of at least the modified blurring kernel that is associated with a slice division to which the reference mask division corresponds. Convolution is a mathematical operation that is known in the art.

In some embodiments, the weighted function of at least the modified blurring kernel is (i.e. equals) the modified blurring kernel. Therefore stage 318 may include system 100 or 200 (e.g. convolver 120 or 220) convolving the reference mask division with the modified blurring kernel, for the plurality of reference mask divisions and the plurality of modified blurring kernels yielding a plurality of convolved reference mask divisions.

In some of such embodiments, a particular modified blurring kernel of the plurality of modified blurring kernels may be larger than a reference mask division that corresponds to a frame division associated with the particular modified blurring kernel. In such a case, the convolution of the reference mask division with the particular modified blurring kernel may include system 100 or 200 (e.g. convolver 120 or 220) convolving the particular modified blurring kernel with an area of the reference mask that includes the corresponding reference mask division and is an appropriate size for the convolution. For example, the area may be centered around the reference mask division and may be of a size appropriate for convolving with the particular modified blurring kernel. The convolution may further include system 100 or 200 (e.g. convolver 120 or 220) extracting a portion (e.g. central portion) of the result of the convolving of the area with the particular modified blurring kernel. For example, the extracted portion may be the size of the reference mask division.

In embodiments where a plurality of convolved reference mask divisions are yielded, performing the action(s) in stage 316 may further include optional stage 320. In stage 320, system 100 or 200 (e.g. concatenator 122 or 222) concatenates the convolved reference mask divisions from stage 318, yielding the altered reference mask. For example, concatenating may include replacing each reference mask division from stage 304 by the convolved reference mask division resulting from the convolution of the reference mask division with a modified blurring kernel. In another example, concatenating may include arranging the convolved reference mask divisions in accordance with the arrangement of the corresponding slice divisions in the slice, altered slice, or neighboring slice.

In some embodiments, the weighted function of stage 318 includes more than one modified blurring kernel and stage 320 may be omitted. For example, for any particular reference mask division, the weighted function may be a weighted sum of the modified blurring kernel associated with the particular slice division to which the particular reference mask division corresponds and a quantity (e.g. 3) of other modified blurring kernels from the plurality of modified blurring kernels. The other modified blurring kernels may be associated with other slice divisions, of the plurality of slice divisions. For example, for every pixel in any particular reference mask division, the other slice divisions (e.g. 3) may be those slice divisions whose centers are closest to the pixel, from among the plurality of slice divisions excepting the particular slice division. In such embodiments, stage 318 may include for every pixel in any particular reference mask division, system 100 or 200 (e.g. convolver 120 or 220) convolving the pixel with a kernel that is the weighted sum relevant to the pixel. For example, the weights may be inversely proportional (e.g. 1/(D+1)) to the Euclidean distance (referred to as "D") from the pixel to the respective centers of the particular slice division associated with the modified blurring kernel and the other slice divisions associated with the other modified blurring kernels. The weights may be normalized to sum up to 1.

As will be understood to those skilled in the art, the altered reference mask that is yielded in stage 316 has pixels that are inter-dependent and therefore similar in value in the spatial range of the weighted function of modified blurring kernel(s), due to the convolution. The altered reference mask may therefore be expected to persist better if moved in the direction(s) and to the extent(s) denoted by the motion vector(s) (e.g. during decoding), than a reference mask (e.g. from stage 304) that was not so altered would persist if moved.

Figure 6:
FIG. 6 illustrates an altered reference mask, in accordance with some embodiments of the presently disclosed subject matter.

FIG. 6 illustrates an altered reference mask 600, in accordance with some embodiments of the presently disclosed subject matter. Altered reference mask 600 may be generated by performing stages 304 to 316 for reference mask 400 and frame 500.

The altered reference mask that is yielded in stage 316 may, for instance, represent a watermark payload for embedding in a video stream. Additionally or alternatively, the altered reference mask may, for instance, be yielded in stage 316 for use in detecting a watermark payload embedded in a video stream.

Method 300 then ends for the reference mask and for the plurality of slice divisions referred to in the description of method 300.

Method 300 may in some embodiments include fewer, more and/or different stages than illustrated in FIG. 3. Additionally or alternatively, the order of stages may be changed from the order illustrated in FIG. 3. For example, stage 304 may be performed after either of stages 308 or 312. Additionally or alternatively, stages shown in FIG. 3 as being performed sequentially may instead be performed concurrently; and/or stages shown in FIG. 3 as being performed concurrently may be performed sequentially. For example, stage 304 may be performed concurrently with stages 308 and/or 312. As another example, stage(s) in method 300 such as stage 308, 312, etc., may not necessarily be performed concurrently for all motion vectors, reference mask divisions, etc. As another example, performance of later stage(s) in method 300 for certain motion vector(s), reference mask division(s), etc. may overlap with performance of earlier stage(s) for other motion vector(s), reference mask division(s), etc.

Method 300 is typically, although not necessarily, performed more than once for a specific video stream.

For instance for a video stream, method 300, or part of method 300, may be repeated for the reference mask referred to in the description of FIG. 3 and for at least one other plurality of slice divisions. Such repetition may in some cases be performed if a total watermark payload is separated into different watermark payloads that are embedded in different parts of the video stream. At least stages 308, 312 and 316 may be repeated in such an instance.

Additionally or alternatively, for instance, method 300, or part of method 300 may be repeated for one or more other reference masks. If the reference mask referred to in the description of FIG. 3 represents the payload of a watermark that is specific to a client device that is to receive the video stream; method 300, or part of method 300, may be repeated for one or more other reference masks that represent payloads of watermark(s) specific to other receiving client device(s). The repetition may be for the same plurality of slice divisions, and/or for different plurality/ies of slice divisions. At least stages 304 and 316 may be repeated in such an instance.

In embodiments where method 300 is performed more than once for a video stream, the various iterations of method 300 may be performed concurrently and/or sequentially.

Figure 7:
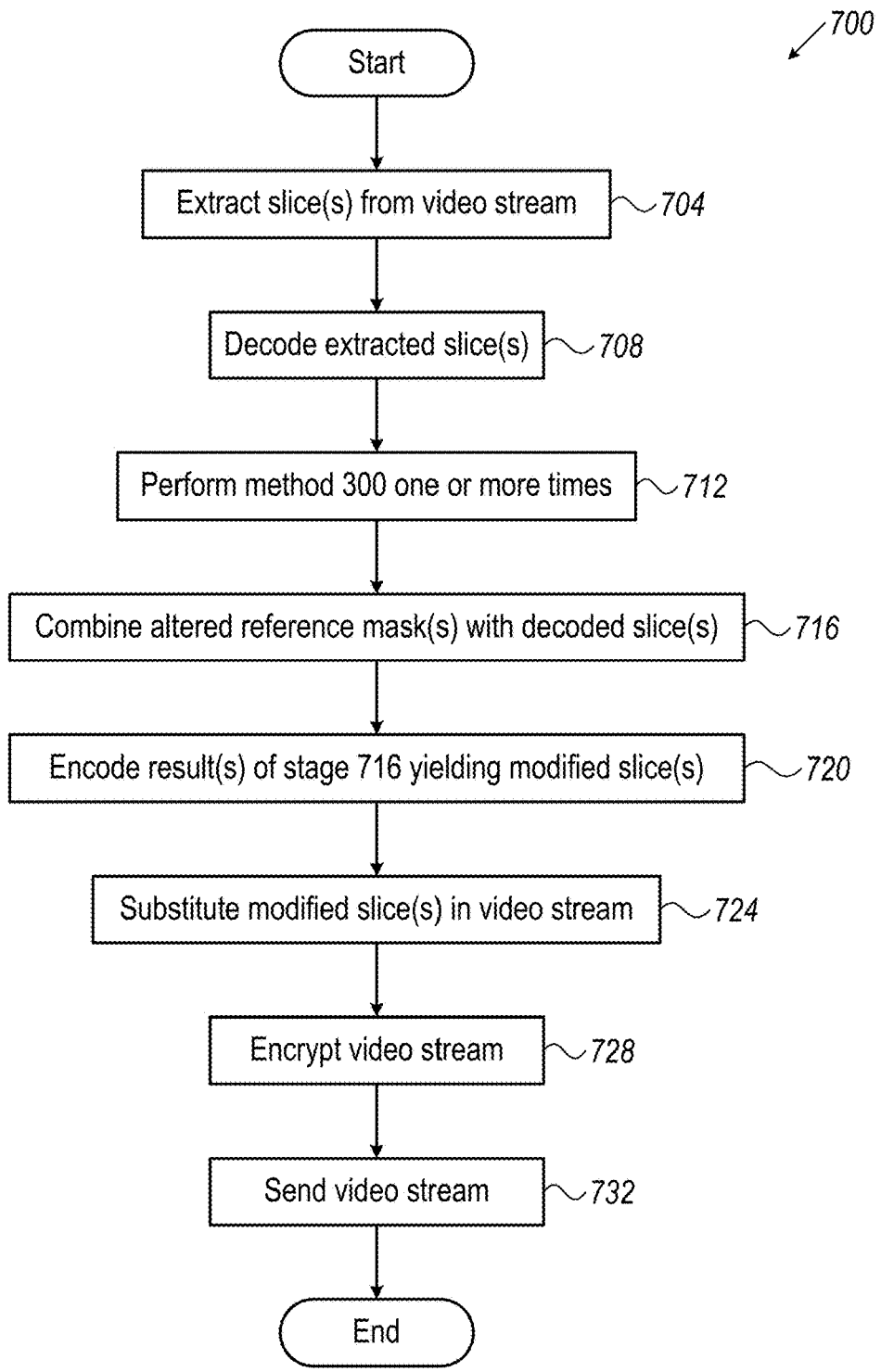
FIG. 7 is another flowchart of a method, in accordance with some embodiments of the presently disclosed subject matter.

FIG. 7 is a flowchart of a method 700, in accordance with some embodiments of the presently disclosed subject matter. Method 700 may be performed by system 100. Method 700 may include method 300 as part of method 700.

In stage 704, system 100 (e.g. extractor 140) extracts one or more slices from a video stream, the video stream having been encoded by an encoder. The extracted slice(s) may be the slice(s) comprising respective plurality/ies of slice divisions that are associated with the motion vectors determined in embodiments of the subject matter (e.g. in stage 308 of FIG. 3), and/or may be slice(s) whose neighboring slice(s) comprise the respective plurality/ies of slice divisions that are associated with the motion vectors determined in embodiments of the subject matter (e.g. in stage 308 of FIG. 3).

In some embodiments, the extracted slices may represent fewer than the quantity of slices in the video stream (meaning less than all of the video stream), and in such embodiments performing method 700 for less than all of the slices of the video stream may provide advantages with respect to total bandwidth overhead, etc. For example, method 700 may be performed for each I-slice of the video stream, and in this example, each I-slice in the video stream may be extracted in stage 704.

In stage 708, system 100 (e.g. decoder 142) decodes the extracted slice(s).

In stage 712, system 100 performs method 300 (FIG. 3) one or more times as described above, yielding altered reference mask(s). If more than one iteration of method 300 is performed, certain of the iteration(s) may not necessarily repeat all of the stages of method 300.

In stage 716 system 100 (e.g. combiner 144) respectively combines the altered reference mask(s) with the decoded slice(s). A given altered reference mask may be combined with a decoded version of the slice that is associated with the movement that was used in generating the altered reference mask (e.g. associated with motion vectors used or whose neighboring slice is associated with motion vectors used to generate the altered reference mask). Combining may include, for instance, alpha-blending, adding, overlaying, blending, etc.

For example, alpha-blending may be performed as is known in the art. The alpha value may be any suitable alpha value, e.g. which enables suitable robustness and/or imperceptibility/suitably low perceptibility. The altered reference mask(s) may, for instance, be added to the luma information and/or chroma plane(s). The resulting values of the adding (e.g. of the reference mask(s) to the luma information and/or chroma plane(s)) may be clipped to maximum RBG/YcbCr/YUV values.

In stage 720, system 100 (e.g. encoder 146) encodes the result(s) of stage 716, yielding modified slice(s). Encoder 146 may, for instance, be the same encoder that encoded the video stream, the same type of encoder as encoded the video stream, or a different type of encoder than the encoder that encoded the video stream, as long as encoder 146 implements the same video standard as used to encode the video stream.

In embodiments where an altered reference mask is combined with a decoded intra-coded slice, encoding the result of the combining may be simpler than embodiments where the altered reference mask is combined with an inter-coded slice.

In stage 724, system 100 (e.g. substitutor 148) substitutes the modified slice(s) in the video stream in place of the extracted slice(s) that were modified (e.g. decoded, combined, encoded etc.) to yield the modified slice(s). For instance, if one or more modified slices resulted from a particular slice that was extracted, then the one or more modified slices may be substituted in the video stream for the particular slice. The remainder of the video stream may remain as encoded by the encoder which generated the video stream.

In some embodiments, in addition to performing stages 704 to 724, system 100 may extract slice(s) or section(s) thereof to which unaltered reference mask(s) (e.g. reference mask(s) of stage 304) may be combined. The result(s) of the combining may be encoded and the encoded result(s) may be substituted into the video stream. For example, there may be a particular reference mask and a particular slice that is extracted and decoded in stages 704 and 708. The particular reference mask and the particular slice may each include two sections. One section of the particular reference mask may be the reference mask which may be altered in accordance with method 300 and then combined in stage 716 with one section of the slice comprising the slice divisions or whose neighboring slice comprises the slice divisions of method 300. The result of such combining may then undergo stages 720 to 724. The other section of the particular reference mask may be unaltered and may be combined with the other section of the slice which was extracted and decoded. The result of such combining may then be encoded and substituted in the video stream.

In stage 728, system 100 (e.g. encryptor 150) encrypts the video stream. Any appropriate encryption may be used. Well known types of encrypting include, for example, DES (Data Encryption Standard), 3DES, and AES (Advanced Encryption Standard). If the video stream is not being encrypted, then stage 728 may be omitted.

In stage 732, system 100 (e.g. sender 152) sends the video stream (whether encrypted or non-encrypted) to one or more client devices.

Method 700 then ends for the described video stream. Method 700 may in some embodiments include fewer, more and/or different stages than illustrated in FIG. 7. For example, encryption stage 728 may be omitted. Additionally or alternatively, the order of stages may be changed from the order illustrated in FIG. 7. For instance, stage 712 may be performed before either of stages 704 or 708. Additionally or alternatively, stages shown in FIG. 7 as being performed sequentially may instead be performed concurrently; and/or stages shown in FIG. 7 as being performed concurrently may be performed sequentially. For example, stage 704 and/or 708 may be performed concurrently with stage 712 for a particular slice. As another example, any stage in method 700 may not necessarily be performed concurrently for various slice(s). As another example, performance of later stage(s) in method 700 for certain slice(s) may overlap with performance of earlier stage(s) for other slice(s).

In some embodiments, method 700 may be performed during the encoding which generated the video stream, instead of, or in addition to, being performed after the video stream was generated. In such embodiments stages 704, 708 and 724 may be omitted. In stage 716, altered reference mask(s) may be combined with uncompressed slice(s). Additionally or alternatively, uncompressed slice(s) may be encoded (e.g. in order to generate encoding information for the slice(s)) and then decoded; then in stage 716 the altered reference mask(s) may be combined with such decoded slice(s). Stage 720 in such embodiments may refer to encoding during the generation of the video stream. In such embodiments, during the generation of the video stream, the altered reference masks may not be compensated for when encoding slices which use inter-prediction from the slice(s) whose uncompressed and/or decoded version(s) were combined with the altered reference mask(s).

It is noted that the self-similarity of an altered reference mask from method 300 may also provide advantages during the encoding of the result of stage 716 (i.e. encoding the result of the combination of the altered reference mask with a decoded or uncompressed slice). A self-similar reference mask may withstand the encoding better than a reference mask that is not self-similar because the encoding (e.g. based on quantized discrete cosine transform coefficients) may tend to preserve lower frequencies and discard higher frequencies. Higher frequencies may be more common in a reference mask that has low or no spatial autocorrelations (e.g. modeled as additive white Gaussian noise with no inter-dependence between pixel values) than in a self-similar reference mask.

Figure 8:
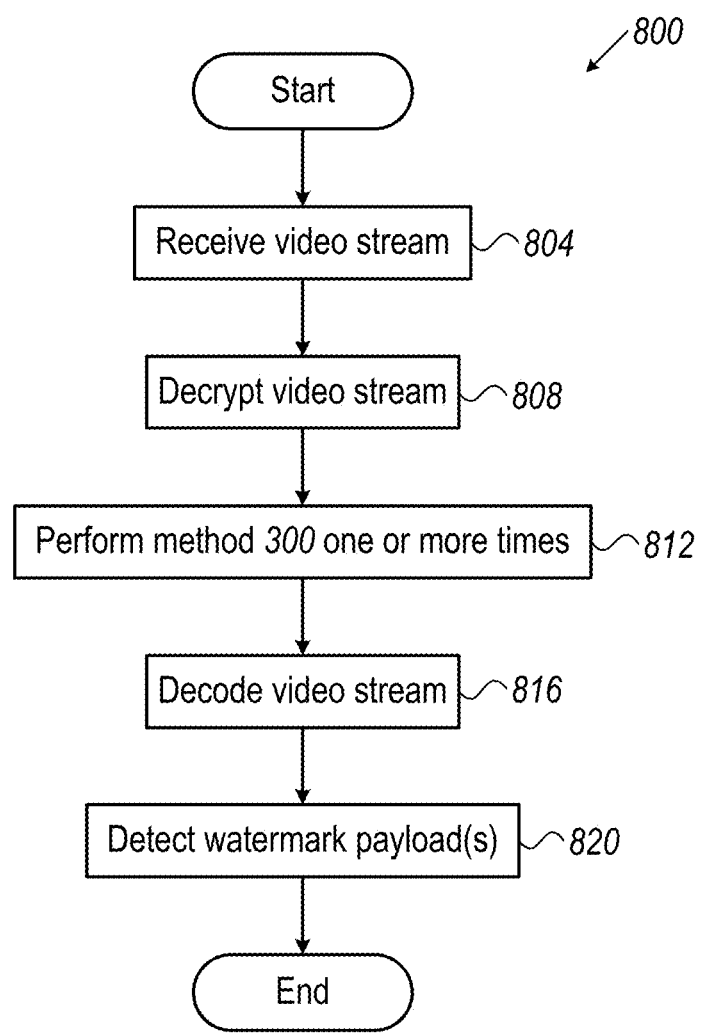
FIG. 8 is another flowchart of a method, in accordance with some embodiments of the presently disclosed subject matter.

FIG. 8 is a flowchart of a method 800, in accordance with some embodiments of the presently disclosed subject matter. Method 800 may be performed by system 200. Method 800 may include method 300 as part of method 800.

In stage 804, system 200 (e.g. receiver 202) receives a video stream, such as the video stream sent in method 700 by system 100, or a video stream that has been changed (e.g. during unauthorized distribution).

In stage 808, system 200 (e.g. decryptor 204) decrypts the video stream, if the video stream is encrypted. The decryption may be any appropriate decryption to reverse the encryption. If the video stream is not encrypted, then stage 808 may be omitted.

In stage 812, system 200 performs method 300 (FIG. 3) one or more times as described above, yielding altered reference mask(s). The slice divisions referred to in method 300 may, for instance, be comprised in altered slice(s) (e.g. modified slice(s) as yielded in stage 720 of FIG. 7 and optionally as subsequently changed afterwards such as during unauthorized distribution) in the video stream. Additionally or alternatively, the slice divisions referred to in method 300 may for instance be comprised in neighboring slice(s) to the altered slice(s). If more than one iteration of method 300 is performed, certain of the iteration(s) may not necessarily repeat all of the stages of method 300.

In stage 816, system 200 (e.g. decoder 242) decodes the video stream. If the video stream includes slice(s) which use inter-prediction from the slice(s) whose decoded/uncompressed version(s) were combined with the altered reference mask(s) (see stage 716—FIG. 7); the altered reference mask(s) (from stage 712—FIG. 7) may drift during the decoding in stage 816 into the slice(s) which use inter-prediction. Additionally or alternatively, the video stream may comprise slice(s) which already include the altered reference mask(s) from stage 712, due to previous drifting during a previous decoding (e.g. during the unauthorized distribution). The latter slice(s), when the video stream was re-encoded (e.g. during the unauthorized distribution), may have been encoded so as to use inter-prediction from the altered slice(s) (e.g. modified slice(s) as yielded in stage 720 and optionally as subsequently changed afterwards such as during the unauthorized distribution). As discussed above, the persistency of the altered reference mask(s) (from stage 712) during the decoding of stage 816, or during an earlier decoding may be caused and/or enhanced in some embodiments of the subject matter because the altered reference mask(s) (from stage 712) were self-similar in a manner that took into account movement, e.g. as described above with reference to method 300.

Depending on the embodiment, the altered reference mask(s) from stage 712, if persisting, may persist for any number of slice(s) (or in other words may drift into any number of slice(s)). For instance, a given altered reference mask from stage 712 that was combined with a decoded/uncompressed version of a certain slice in stage 716 and that persists, may persist for one or more slices, but may not persist up until the next altered slice, if any, which was altered from a slice whose decoded/uncompressed version thereof was combined with the given altered reference mask (or with a different altered reference mask); may persist up until the next altered slice; or may persist beyond the next altered slice.

In stage 820 system 200 (e.g. detector 260) detects the watermark payload(s) embedded in the video stream by using the altered reference mask(s) from stage 812. For example, embedded watermark payload(s) may be detected by using the altered reference mask(s) from stage 812 to detect the watermark payload(s) in the decoded slice(s) from stage 816. More specifically, detection may include, for instance, correlating (e.g. linearly correlating) the altered reference mask(s) from stage 812 with decoded slice(s) from stage 816, and detecting the watermark payload(s) when the correlation results in high correlation coefficient(s). For example, the decoded slice(s) from stage 816 may include decoded altered slice(s). Additionally or alternatively, the decoded slice(s) may include decoded other slice(s) which use inter-prediction from the altered slice(s) and/or from slice(s) which were altered to yield the altered slice(s) (e.g. during stage(s) 708, 716, and 720 of FIG. 7, and optionally afterwards such as during the unauthorized distribution). Correlation with such decoded altered slice(s) and/or decoded other slice(s) may be expected to result in high correlation coefficient(s), assuming the altered reference mask(s) from stage 812 are sufficiently correlated with the altered reference mask(s) from stage 712.

It is noted that the altered reference mask(s) yielded in stage 812 may not necessarily be the same as the altered reference mask(s) yielded in method 712-FIG. 7. Possible reasons for such differences were discussed above with reference to FIG. 2. However, since altered reference mask(s) yielded in stage 812 and stage 712 are generated in a similar manner (e.g. using method 300), respective related altered reference masks (e.g. a first and a second altered reference masks that are related) may be sufficiently correlated for watermark payload(s) detection to be successful. For example, a first and a second altered reference masks may be sufficiently correlated and the watermark payload(s) detection may therefore be successful under the following conditions: The slice divisions in method 300 (that was executed in stage 712 and that yielded the first altered reference mask) are comprised in a particular slice, or a neighboring slice. The particular slice was altered to yield a particular altered slice comprising the slice divisions in method 300 which was executed in stage 812, or whose neighboring slice comprises the slice divisions in method 300 executed in stage 812. Method 300 executed in stage 812 yielded the second altered reference mask.

Detection of the watermark payload(s) may in addition to, or instead of, what was described above with reference to stage 820, include any suitable techniques known in the art. For example, in some embodiments, stage 812 may be omitted and the reference mask(s) used for detection of the watermark(s) in stage 820 may be reference mask(s) having low or no spatial autocorrelations (e.g. modeled as additive white Gaussian noise with every pixel being independent from all others).

Additionally or alternatively to what was described above with reference to stage 820, mention is now made of the example reference mask discussed above which comprises two sections one of which is altered, and the other of which is not altered. With regard to such an example reference mask, the example reference mask, and/or each of the altered and not altered sections separately, may be correlated in stage 820 with decoded slice(s) from stage 816 in order to detect the watermark payload(s).

Method 800 then ends for the described video stream. Method 800 may in some embodiments include fewer, more and/or different stages than illustrated in FIG. 8. For example, decryption stage 808 may be omitted. Stages shown in FIG. 8 as being performed sequentially may in some embodiments be performed in parallel; and/or stages shown in FIG. 8 as being performed concurrently may be performed sequentially. For example, stages 812 and 816 may be performed in any order, or concurrently. As another example, additionally or alternatively, any stage in method 800 may not necessarily be performed concurrently for various part(s) of the video stream. As another example, additionally or alternatively, performance of later stage(s) for certain parts(s) of the video stream may overlap with performance of earlier stage(s) for other part(s) of the video stream.

Each of the modules described herein with reference to FIG. 1 or FIG. 2 may be implemented by hardware and/or software that is appropriate for performing the functionality attributed to the module herein, for instance as attributed in the description of any of methods 300, 700 or 800. Functionality attributed herein to a particular module may in some embodiments be performed additionally or alternatively by other module(s), and the hardware and/or software of the various modules may be adjusted accordingly. Software may include firmware, when appropriate. For efficient processing, integrated circuit(s) such as application-specific integrated circuit(s) (ASIC(s)), field programmable gate array(s) (FPGA(s)), full-custom integrated circuit(s), etc. or a combination of such integrated circuits, may for example, implement one or more of the modules of system 100 and/or 200 discussed herein. Alternatively or additionally, hardware processor(s), such as graphics processing unit(s) (GPU(s)), digital signal processor(s) (DSP(s)) and/or central processing units (CPU(s)), adapted to execute suitable software may implement one or more of the modules of system 100 and/or 200 discussed herein. Additionally or alternatively, one or more computer readable media having suitable software embodied therein may implement one or more of the modules of system 100 and/or 200 discussed herein. In some cases integrated circuit(s), hardware processor(s) and/or one or more computer readable media may each implement a part of a particular module of system 100 or system 200 discussed herein. Module(s) may be considered to be implemented, for example, when the integrated circuit(s), hardware processor(s), and/or computer readable medium/a are adapted for the functionality of the module(s). Continuing with describing such an example, an integrated circuit may be adapted for functionality of a module by being adapted to perform such functionality. A hardware processor may be adapted for functionality of a module by being adapted to perform such functionality through the execution of software. A computer readable medium may be adapted for functionality of a module by embodying software for such functionality.

A computer readable medium, for example, may include any suitable medium for transferring software, e.g. if software is downloaded to the hardware processor(s) in electronic form, over a network. Alternatively or additionally, a computer readable medium may include any suitable storage medium for storing software, such as an optical storage medium, a magnetic storage medium, or an electronic storage medium. The location of a storage medium embodying software (also referred to as computer readable program code) relative to a hardware processor which reads the computer readable program code may vary depending on the embodiment and may include any appropriate location (e.g. in the same physical machine, not in the same machine but otherwise local, remote, etc.).

Integrated circuit(s), hardware processor(s), and/or computer readable medium/a may in some embodiments be shared among two or more modules discussed herein with reference to FIG. 1 and/or FIG. 2, and/or among other module(s) that may be included in a headend and/or in an operations security center. The other module(s) may be included for functionality that is related to the subject matter and/or for functionality that is unrelated/tangential to the subject matter (e.g. conventional functionality)

In embodiments where a video stream is sent and/or received over a network, the network may be implemented using any appropriate wired and/or wireless technology for transferring, e.g. appropriate for the operation of sending the video stream, and/or the operation of receiving the video stream. For example, sending from a headend to a client device via a network may include satellite transmission, terrestrial transmission, cable, over-the-top transmission, etc. A system which sends or receives (e.g. system 100 or 200) a video stream via a network may include suitable conventional element(s) for transferring via the network, where such element(s) may vary depending on the technology of the network. Examples of such element(s) include network interface(s), transmitter(s), receiver(s), modulator(s) and/or demodulator(s), etc. For instance, such element(s) may implement sender 152 and/or receiver 202. If the network includes a computer network (e.g. a content delivery network, etc.), cryptographic protocol(s) such as Secure Sockets Layer and/or Transport Layer Security, etc. may be implemented, when suitable.

A system in accordance with some embodiments of the subject matter may include system 100, or a part of system 100. Alternatively, a system in accordance with some embodiments of the subject matter may include system 200 or a part of system 200. Alternatively, a system in accordance with some embodiments of the subject matter may include a combination of system 100 or a part thereof and of system 200 or a part thereof. Additionally or alternatively, a system in accordance with some embodiments of the subject matter optionally includes other module(s) not shown in the figures (e.g. such as an encoder which generated the video stream that is not encoder 146, module(s) for conventional functionality, etc.).

Additionally or alternatively, a system in accordance with some embodiments of the subject matter may include fewer, more and/or different modules than described herein with reference to system 100, as long as the system includes the functionality described herein with reference to determiner 112, modifier 116, reference mask divider 118, and action performer 121. For example, in order to at least implement the functionality of modules 112, 116, 118, and 121, a system in accordance with some embodiments of the subject matter may include at least one integrated circuit, at least one computer readable medium, and/or at least one hardware processor.

Additionally or alternatively, a system in accordance with some embodiments of the subject matter may include fewer, more and/or different modules than described herein with reference to system 200, as long as the system includes the functionality described herein with reference to determiner 212, modifier 216, reference mask divider 218, and action performer 221. For example, in order to at least implement the functionality of modules 212, 216, 218, and 221, a system in accordance with some embodiments of the subject matter may include at least one integrated circuit, at least one computer readable medium, and/or at least one hardware processor.

Additionally or alternatively, a system in accordance with some embodiments of the subject matter may include fewer, more and/or different modules than described herein with reference to system 200, as long as the system includes the functionality described herein with reference to decoder 242 and detector 260. Such as system need not perform method 300. For example, in order to at least implement the functionality of decoder 242 and detector 260, a system in accordance with some embodiments of the subject matter may include at least one integrated circuit, at least one computer readable medium, and/or at least one hardware processor.

Additionally or alternatively, a system in accordance with some embodiments of the subject matter may include at least one integrated circuit, at least one computer readable medium, and/or at least one hardware processor; regardless of the functionality that is implemented by the at least one integrated circuit, the at least one computer readable medium, and/or the at least one hardware processor.

Additionally or alternatively, a system in accordance with some embodiments of the subject matter may be a headend or may be included in a headend. Additionally or alternatively, a system in accordance with some embodiments of the subject matter may be an operations security center, or may be included in an operations security center. The operations security center and the headend may in some cases share hardware processor(s), one or more computer readable media, and/or integrated circuit(s), e.g. if the operations security center and the headend are co-located.

Although for simplicity's sake, the above description referred to each of the modules described with reference to FIG. 1 or 2, in the single form, in some embodiments, there may be a plurality of any of such module(s). Functionality described herein as being performed by a certain number of different modules, may be performed in some embodiments by fewer or more modules. For instance, determiner 112, modifier 116, reference mask divider 118, and action performer 121 may be combined into fewer modules, or may be distributed into more modules, where the fewer or more modules perform the functionality described herein for modules 112, 116, 118, and 121. As another instance, determiner 212, modifier 216, reference mask divider 218, and action performer 221 may be combined into fewer modules, or may be distributed into more modules, where the fewer or more modules perform the functionality described herein for modules 212, 216, 218, and 221.

It will be appreciated that the subject matter contemplates, for example, a computer program product comprising a computer readable medium having computer readable program code embodied therein for causing a hardware processor to execute one or more methods and/or one or more parts of method(s) disclosed herein. Further contemplated, for example, are computer readable program code for causing a hardware processor to execute method(s) and/or part(s) of method(s) disclosed herein; and/or a computer readable medium having computer readable program code embodied therein for causing a hardware processor to execute method(s) and/or part(s) of method(s) disclosed herein. Computer readable code for causing a hardware processor to execute method(s) and/or part(s) of method(s) disclosed herein may, depending on the embodiment, actually cause one or more hardware processors to execute such method(s) and/or part(s) of method(s) disclosed herein.

It will additionally be appreciated that in the above description of example embodiments, numerous specific details were set forth in order to provide a thorough understanding of the subject matter. However, it will be understood by those skilled in the art that some examples of the subject matter may be practiced without these specific details. In other instances, well-known features have not been described in detail so as not to obscure the subject matter.

It will further be appreciated that various features of the subject matter which are, for clarity, described herein in the contexts of separate embodiments may also be provided in combination in a single embodiment. Conversely, various features of the subject matter which are, for brevity, described herein in the context of a single embodiment may also be provided separately or in any suitable subcombination.

It will yet further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A method comprising:
   dividing a reference mask into a plurality of reference mask divisions;
   determining a plurality of motion vectors respectively associated with a plurality of slice divisions, wherein the plurality of reference mask divisions respectively correspond to the plurality of slice divisions;
   modifying a blurring kernel in accordance with the plurality of motion vectors, yielding a plurality of modified blurring kernels that are respectively associated with the plurality of slice divisions; and
   performing at least one action to yield an altered reference mask, including for the plurality of reference mask divisions and the plurality of modified blurring kernels: convolving a reference mask division with a weighted function of at least a modified blurring kernel associated with a slice division, of the plurality of slice divisions, to which the reference mask division corresponds.

2. A non-transitory computer readable medium that stores a set of instructions which when executed perform a method executed by the set of instructions comprising:
   dividing a reference mask into a plurality of reference mask divisions;
   determining a plurality of motion vectors respectively associated with a plurality of slice divisions, wherein the plurality of reference mask divisions respectively correspond to the plurality of slice divisions;
   modifying a blurring kernel in accordance with the plurality of motion vectors, yielding a plurality of modified blurring kernels that are respectively associated with the plurality of slice divisions; and
   performing at least one action to yield an altered reference mask, including for the plurality of reference mask divisions and the plurality of modified blurring kernels: convolve a reference mask division with a weighted function of at least a modified blurring kernel associated with a slice division, of the plurality of slice divisions, to which the reference mask division corresponds.

3. The non-transitory computer medium of claim 2, wherein the altered reference mask represents a watermark payload for embedding in a video stream.

4. The non-transitory computer medium of claim 3, wherein the method executed by the set of instructions further comprising:
   combining the altered reference mask with an uncompressed version of a slice comprising the plurality of slice divisions; and
   encoding a result of the combining, yielding a modified slice, wherein the watermark payload is embedded in the video stream by including the modified slice in the video stream.

5. The non-transitory computer medium of claim 4, wherein the method executed by the set of instructions further comprising sending the video stream including the modified slice to at least one client device.

6. The non-transitory computer medium of claim 4, wherein the video stream is encoded in accordance with an H.264 video standard or an H.265 video standard.

7. The non-transitory computer medium of claim 4, wherein the altered reference mask is yielded to detect a watermark payload embedded in a video stream.

8. The method of claim 1, further comprising:
   decoding an altered slice comprising the plurality of slice divisions, the altered slice being in the video stream, yielding a decoded slice; and
   detecting a watermark payload embedded in the video stream by using the altered reference mask to detect the watermark payload in the decoded slice.

9. The method of claim 1, further comprising:
   decoding an altered slice having a neighboring slice comprising the plurality of slice divisions, the altered slice being in the video stream, yielding a decoded slice; and
   detecting a watermark payload embedded in the video stream by using the altered reference mask to detect the watermark payload in the decoded slice.

10. The method of claim 1, further comprising:
    decoding another slice in the video stream, the another slice being inter-predicted from the altered slice, yielding a decoded slice; and
    detecting a watermark payload embedded in the video stream by using the altered reference mask to detect the watermark payload in the decoded slice.

11. The method of claim 1, further comprising:
    determining a plurality of magnitudes and a plurality of angles, respectively, for the plurality of motion vectors;
    stretching the blurring kernel in a horizontal direction by a function of a magnitude of a motion vector, yielding a stretched blurring kernel;
    rotating the stretched blurring kernel by an angle of the motion vector, yielding a rotated stretched blurring kernel; and
    normalizing the rotated stretched blurring kernel.

12. The method of claim 1, further comprising:
    combining the altered reference mask with a decoded version of a slice comprising the plurality of slice divisions; and
    encoding a result of the combining, yielding a modified slice, wherein a watermark payload is embedded in the video stream by including the modified slice in the video stream, and wherein the watermark payload represents the altered reference mask.

13. The method of claim 12, further comprising sending the video stream including the modified slice to at least one client device.

14. The method of claim 1, further comprising:
    combining the altered reference mask with an uncompressed version of a slice comprising the plurality of slice divisions;
    encoding a result of the combining, yielding a modified slice, wherein the watermark payload is embedded in the video stream by including the modified slice in the video stream, and wherein the watermark payload represents the altered reference mask; and sending the video stream including the modified slice to at least one client device.

15. An apparatus comprising:
a memory storage; and
a processing unit coupled to the memory storage, wherein the processing unit is operative to:
   divide a reference mask into a plurality of reference mask divisions;
   determine a plurality of motion vectors respectively associated with a plurality of slice divisions, wherein the plurality of reference mask divisions respectively correspond to the plurality of slice divisions;
   modify a blurring kernel in accordance with the plurality of motion vectors, yielding a plurality of modified blurring kernels that are respectively associated with the plurality of slice divisions; and
   perform at least one action to yield an altered reference mask, including for the plurality of reference mask divisions and the plurality of modified blurring kernels: convolving a reference mask division with a weighted function of at least a modified blurring kernel associated with a slice division, of the plurality of slice divisions, to which the reference mask division corresponds.

16. The apparatus of claim 15, wherein the altered reference mask represents a watermark payload for embedding in a video stream.

17. The apparatus of claim 16, wherein the video stream is encoded in accordance with one of the following: an H.264 video standard and an H.265 video standard.

18. The apparatus of claim 15, wherein the altered reference mask is yielded to detect a watermark payload embedded in a video stream.

19. The apparatus of claim 15, wherein the weighted function is a weighted sum of:
   the modified blurring kernel associated with the slice division to which the reference mask division corresponds, and
   a quantity of other modified blurring kernels, of the plurality of modified blurring kernels, the other modified blurring kernels being associated with other slice divisions, of the plurality of slice divisions.

20. The apparatus of claim 15, wherein the processing unit is further operative to:
   combine the altered reference mask with an uncompressed version of a slice comprising the plurality of slice divisions;
   encode a result of the combining, yielding a modified slice, wherein the watermark payload is embedded in the video stream by including the modified slice in the video stream, and wherein the watermark payload represents the altered reference mask; and
   send the video stream including the modified slice to at least one client device.

* * * * *